(12) United States Patent
Coudray et al.

(10) Patent No.: US 6,361,135 B1
(45) Date of Patent: Mar. 26, 2002

(54) METHOD AND DEVICE FOR DETERMINING THE DISTRIBUTION OF PRODUCT PRESENT IN A RESERVOIR, NOTABLY INK IN AN IMAGE DEVICE

(75) Inventors: Pascal Coudray, La Chapelle des Fougeretz; Marie-Hélène Froger, Chateaugiron; Christophe Truffaut, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/784,192

(22) Filed: Jan. 15, 1997

(30) Foreign Application Priority Data

Jan. 22, 1996 (FR) ............................................ 96 00661

(51) Int. Cl.⁷ ............................ B41J 2/195; B41J 2/175
(52) U.S. Cl. ................................. 347/7; 347/7; 347/85; 347/86
(58) Field of Search ................................ 347/7, 12, 13, 347/9, 11, 31, 23, 14, 19, 37, 86, 85

(56) References Cited

U.S. PATENT DOCUMENTS

| 4,700,754 A | | 10/1987 | Kringe | 141/95 |
|---|---|---|---|---|
| 4,788,861 A | * | 12/1988 | Lichti | 347/7 |
| 5,070,346 A | * | 12/1991 | Mochizuki et al. | 347/7 |
| 5,162,817 A | * | 11/1992 | Tajika et al. | 347/7 |
| 5,329,304 A | | 7/1994 | Koizumi et al. | 347/7 |
| 5,574,484 A | * | 11/1996 | Cowger | 347/7 |

FOREIGN PATENT DOCUMENTS

| EP | 0370765 A3 | 5/1990 |
|---|---|---|
| EP | 0370765 A2 | 5/1990 |
| EP | 0381392 A3 | 8/1990 |
| EP | 0661162 A2 | 7/1995 |
| EP | 0684135 A2 | 11/1995 |
| GB | 2275534 A | 8/1994 |
| JP | 63158262 A | 7/1988 |
| JP | 6297726 | 10/1994 |

OTHER PUBLICATIONS

Howard F. Entwistle, "Survey of Level Instruments," Advances in Instrumentation and Control 46, part 2 (1991), pp. 1319–1354.

* cited by examiner

Primary Examiner—John Barlow
Assistant Examiner—Charles W. Stewart, Jr.
(74) Attorney, Agent, or Firm—Fitzpatrick, Cella, Harper & Scinto

(57) ABSTRACT

In order to determine a distribution of product present in a reservoir (112), particularly a distribution of ink in the reservoir of an image transfer device, a device includes electrodes (121, 122) disposed in contact with the product in the reservoir, a circuit (117) for successively supplying the electrodes with an excitation signal (SE) causing an electromagnetic radiation from the product, a receiving antenna (116) for sensing the electromagnetic radiation caused by the respective supplying of the electrodes, and a circuit (115) for processing the radiation sensed into a signal representing the distribution of product contained in the porous body inside the reservoir.

78 Claims, 10 Drawing Sheets

Figure 1:
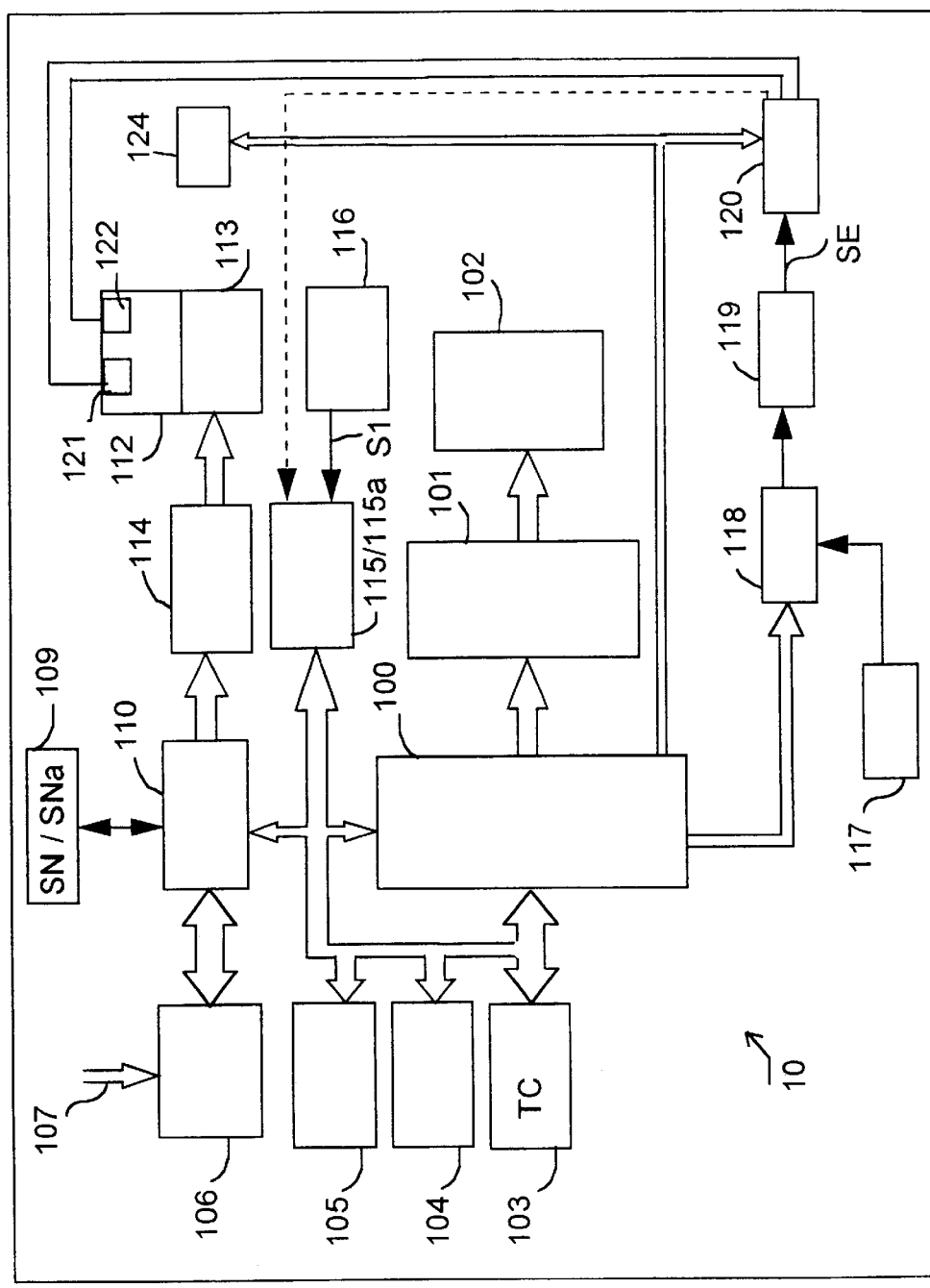

METHOD AND DEVICE FOR DETERMINING THE DISTRIBUTION OF PRODUCT PRESENT IN A RESERVOIR, NOTABLY INK IN AN IMAGE DEVICE

The present invention concerns in general terms a method and device for determining the distribution of a product present in a reservoir. The type of product and reservoir considered here are such that the product is liable to be distributed heterogeneously in the reservoir, meaning that different zones of the reservoir can contain different quantities of product.

The invention relates more especially to a method and device for determining the distribution of ink in a reservoir of an image transfer device.

The type of reservoir containing a porous body soaked with ink in liquid form is widely used amongst image transfer devices, such as printers or facsimile machines. However, this type of reservoir can present the following problem. As a result for example of poor storage conditions, or a long period of time between two utilisations of the image transfer device, the ink contained in the porous body of the reservoir may be distributed heterogeneously in the reservoir. The functioning of the image transfer device is then impaired; for example, if there is less ink near to the ink outlet orifice than in the rest of the reservoir, the user will have the impression that the reservoir is empty. A reservoir containing ink in powder form, for a laser printer, can present a similar problem.

For image transfer devices which use ink jet technology, such as ink jet printers, devices and methods have been designed for determining the quantity of ink remaining in the reservoir.

A first type of known detection uses the electrical characteristics of the ink by measuring the resistance of the latter between two electrodes.

The document EP-A-0 370 765 describes a device for detecting the quantity of ink present in a reservoir, comprising two electrodes placed in the duct connecting an ink ejection head to the ink reservoir as well as a means for detecting the electrical resistance between the two electrodes. The first electrode is situated close to the ejection head while the second is distanced from the latter. A potential difference is applied between these two electrodes. The resistance of the ink is measured. Thus, in the event of a notable decrease in the expected ink flow, the resistance value increases, which enables this decrease to be detected.

The use of this device does not enable the distribution of ink in a reservoir to be measured.

A second known type of detection uses the electrical characteristics of the ink by measuring the capacitance of the latter.

The document U.S. Pat. No. 4,700,754 describes the detection of the level of liquid ink in a flexible reservoir which contracts as the level of ink decreases. The bottom external wall is coated with a conducting layer forming one electrode of a capacitor. The reservoir wall acts as a dielectric for the capacitor thus formed whilst the ink surface in contact with the bottom wall forms the second face of the capacitor. A measuring electrode placed in the centre of the reservoir connects the ink to a measuring device. When the quantity of ink decreases, the ink surface against the conducting layer coating the wall decreases, and therefore the equivalent capacitance value also decreases.

This second type of detection is used for a cartridge with flexible walls and cannot be applied to rigid cartridges. This is because the contact between the measuring circuit and the ink can be made only if the top wall, when crushed, forces the measuring electrode to be in contact with the ink.

Moreover, this measurement of the ink level is possible only for liquid ink contained in a reservoir without a porous body. The distribution of ink cannot be measured with this known device.

The present invention aims to remedy the drawbacks of the prior art by providing a device and method for determining the distribution of a product contained in a reservoir.

The invention starts from the observation made by the inventors in the course of tests, that an electrical excitation of a product causes electromagnetic radiation from the latter, and that this radiation depends not only on the excitation signal, but also on the quantity of product surrounding the electrode.

In general terms, the invention proposes a method for determining the distribution of a product present in a reservoir, characterised in that it comprises the operations of:

exciting a plurality of points in the reservoir, and processing the radiation caused by the excitation operation.

Correlatively, the invention proposes a device for determining the distribution of a product present in a reservoir, characterised in that it comprises:

an excitation means adapted to excite a plurality of points in the reservoir, and a means for processing the radiation caused by the excitation means.

The method and device according to the invention have not only the advantage of solving the technical problem stated above, but also of being adaptable to a large number of existing image transfer devices.

Generally, the invention is applicable to any product, notably a product forming a consumable product used in a given device.

Preferably, the invention applies to ink contained in the reservoir of an image transfer device. "Ink" here means any liquid, gaseous, solid or powder product designed to modify an optical or physical factor of the printing medium.

According to a preferred embodiment, the method is characterised in that on the one hand a plurality of electrodes is distributed inside the reservoir, and on the other hand it comprises the operations of:

supplying the said electrodes with a predetermined excitation signal, picking up electromagnetic signals caused by the supplying of the electrodes with the excitation signal, in order to produce electrical signals representing the electromagnetic signals, and processing the electrical signals to produce a signal representing the distribution of product present in the reservoir.

Correlatively, in the preferred embodiment, the device is characterised in that it includes:

a plurality of electrodes disposed in the reservoir, so as to be in contact with the product, a means for supplying the electrodes with a predetermined excitation signal causing electromagnetic signals radiated by the product, a means for sensing the electromagnetic signals caused by the respective supplying of the electrodes and producing electrical signals representing the electromagnetic signals, and a means for processing the electrical signals into a signal representing the distribution of product present in the reservoir.

It will be observed that these arrangements are particularly simple to implement as regards both the structure of the reservoir and the electronic processing means.

In the preferred embodiment, the supplying and sensing operations of the method are carried out successively for each of the electrodes, with the same excitation signal, or, as a variant, the supplying operation comprises the simultaneous supplying of the electrodes with excitation signals different from each other.

According to a first preferred embodiment which is simple and economical to implement, the processing operation includes the operations of:

detecting the respective amplitude of the electrical signals,
  calculating the differences between one of the amplitudes and the other amplitudes, and
  producing the signal representing the distribution of the product from a value given in a calibration table as a function of the differences calculated.

Correlatively, the processing means includes an envelope detector for detecting the amplitudes of the electrical signals, a means for calculating the differences between one of the detected amplitudes and the other detected amplitudes and a means of converting the calculated differences into a distribution of the product present in the reservoir.

According to a second preferred embodiment, less sensitive to any external perturbations than the previous one, the processing operation includes the operations of:

detecting a respective phase difference between each of the electrical signals and the excitation signal,
  calculating the differences between one of the phase differences and the other phase differences, and
  producing the signal representing the distribution of the product from a value given in a calibration table depending on the calculated differences.

Correlatively, the processing means includes a phase comparator for determining the phase differences between the excitation signal and each of the electrical signals respectively, a means for calculating the differences between one of the phase differences and the other phase differences and a means for converting the calculated differences into a distribution of the product present in the reservoir.

According to a variant of the second embodiment, the processing operation includes:

the detection of the phase differences between the electrical signals considered in pairs, and
  the production of the signal representing the distribution of the product from a given value in a calibration table according to the detected differences.

Advantageously, the method also includes the operation of displaying a representation of the distribution of product present in the reservoir, and the device therefore has a display means. By virtue of this display, the user always knows the distribution of product. The method can also include the operation of transmitting the signal representing the distribution of product present in the reservoir to a remote device in order that it may display a representation of the distribution of product present in the reservoir.

Advantageously, the electrodes are situated in different parts of the reservoir, and in particular a first electrode is situated near to an outlet orifice of the reservoir and at least one second electrode is situated at a distance from the first. In this way, the detection conditions are optimised.

According to preferred characteristics of the invention, allowing simple and economic implementation thereof, the means for supplying the electrodes includes an oscillator connected to the electrodes via a switch, and a selector for selectively supplying one of the electrodes.

Advantageously, the excitation signal is an alternating high-frequency signal, preferably at a frequency above 10 MHz. Such an excitation signal produces radiated electromagnetic signals which are easily detectable and easy to use within the framework of the invention.

According to one embodiment, the means for supplying the electrodes provides a signal of different frequency to each of the electrodes. In this case, the device has filters for filtering the electrical signals and supplying the filtered signals to the processing means.

Preferably, the means for sensing the electromagnetic signal is a metal component forming an antenna, such as a metal ribbon.

The invention is adaptable to determining the distributions of product present in several reservoirs respectively; the device is then characterised in that it includes:

a plurality of electrodes disposed in each reservoir, so as to be in contact with the product present therein,
  a means for supplying the electrodes of each reservoir with a predetermined excitation signal causing electromagnetic signals from the product in each reservoir,
  a means for sensing the electromagnetic signals and for producing electrical signals representing the electromagnetic signals, and
  a means for processing the electrical signals into a signal representing the distribution of product present in each reservoir.

In another aspect, the invention concerns a product reservoir, such as an ink reservoir, characterised in that it includes a plurality of electrodes disposed in the reservoir, so as to be in contact with the product, and connecting means enabling supplying with an excitation signal causing electromagnetic signals radiated by the product.

In yet another aspect, the invention concerns an image transfer device comprising a reservoir containing ink, characterised in that it includes:

a plurality of electrodes disposed in the reservoir, so as to be in contact with the ink,
  a means for supplying the electrodes with a predetermined excitation signal causing electromagnetic signals radiated by the ink,
  a means for sensing the electromagnetic signals caused by the supplying of the electrodes and for producing electrical signals representing the electromagnetic signals, and
  a means for processing the electrical signals into a signal representing the distribution of ink present in the reservoir.

Figure 2:
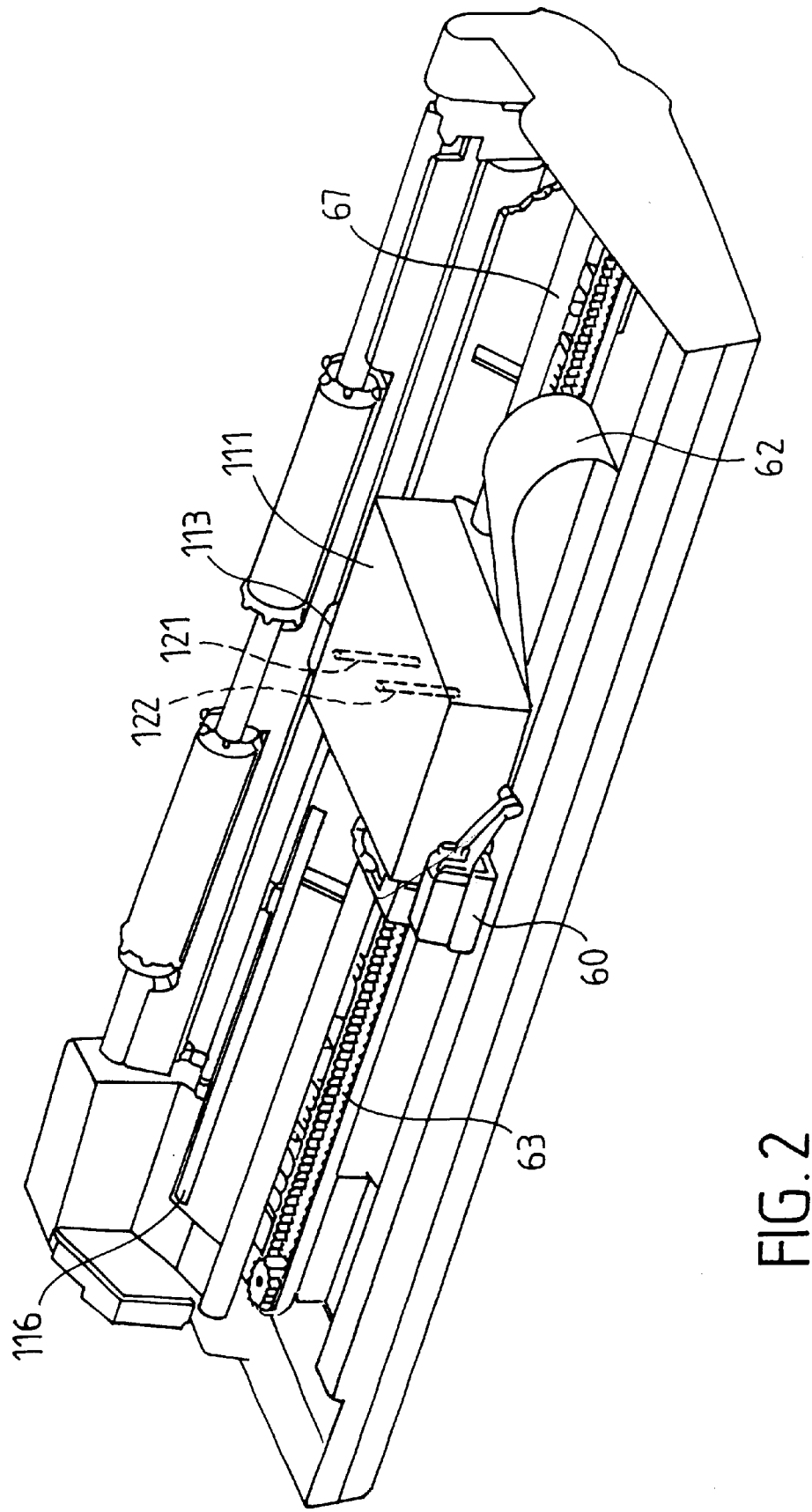
Figure 3:
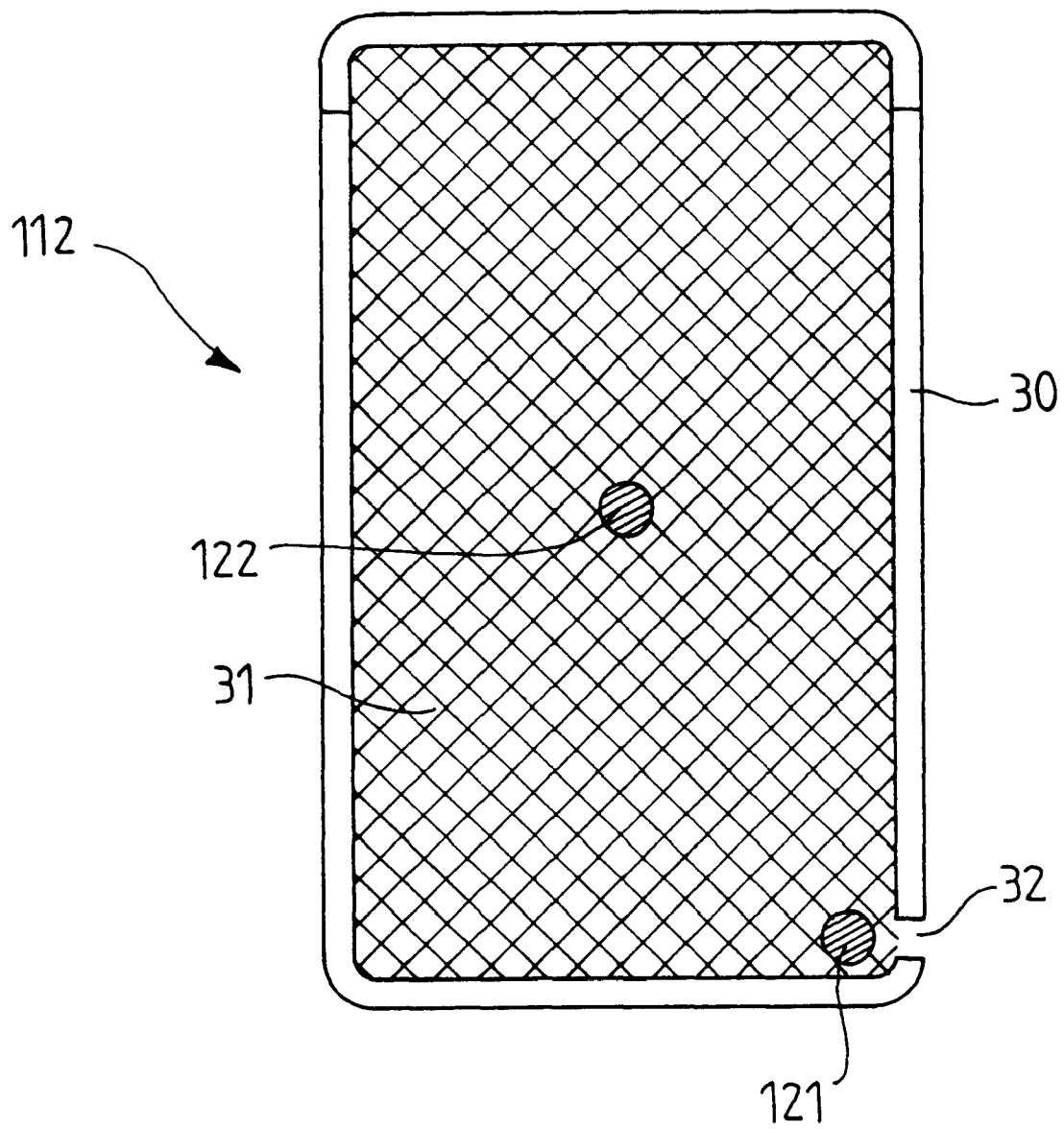
Figure 4:
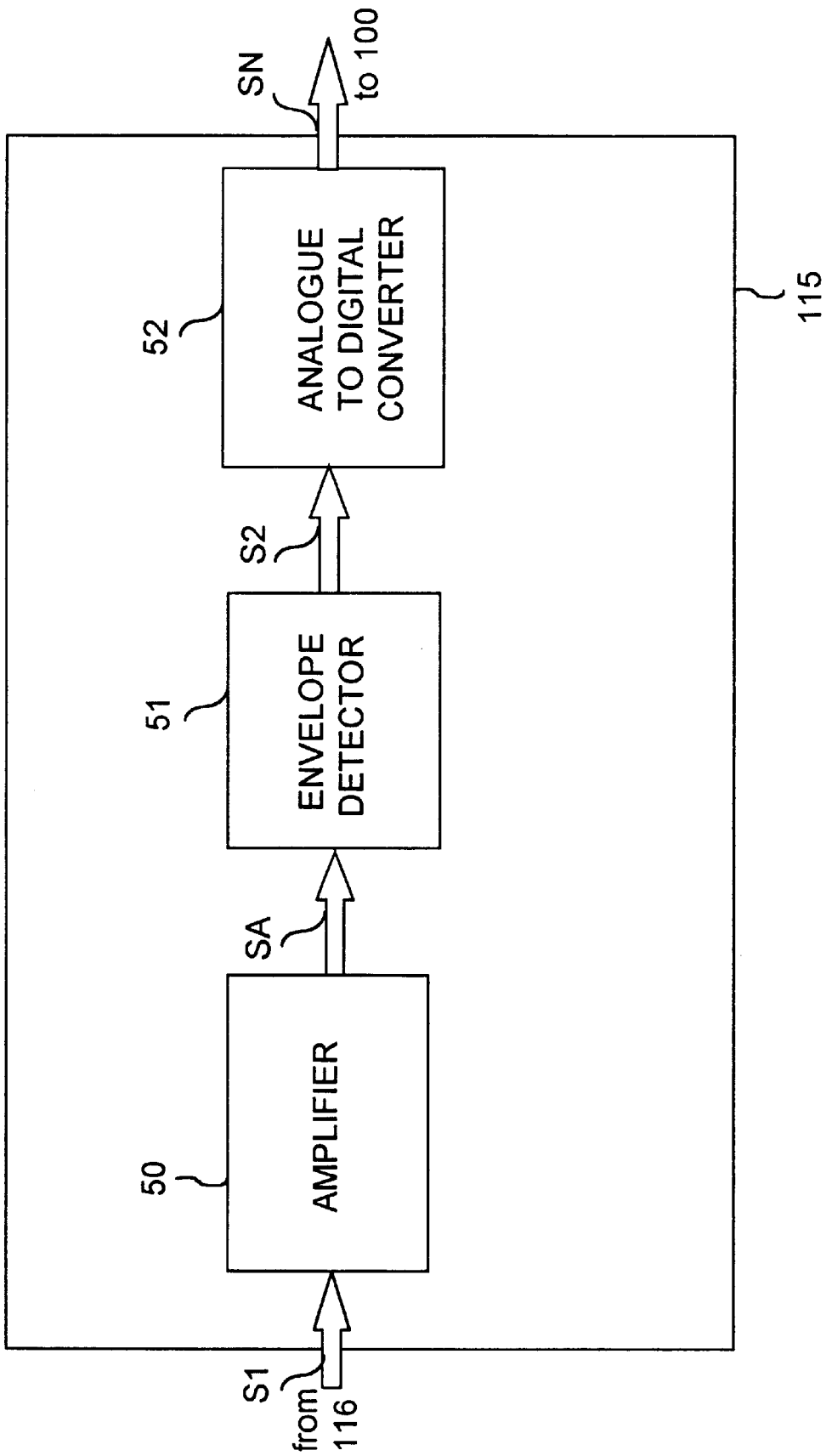
Figure 5:
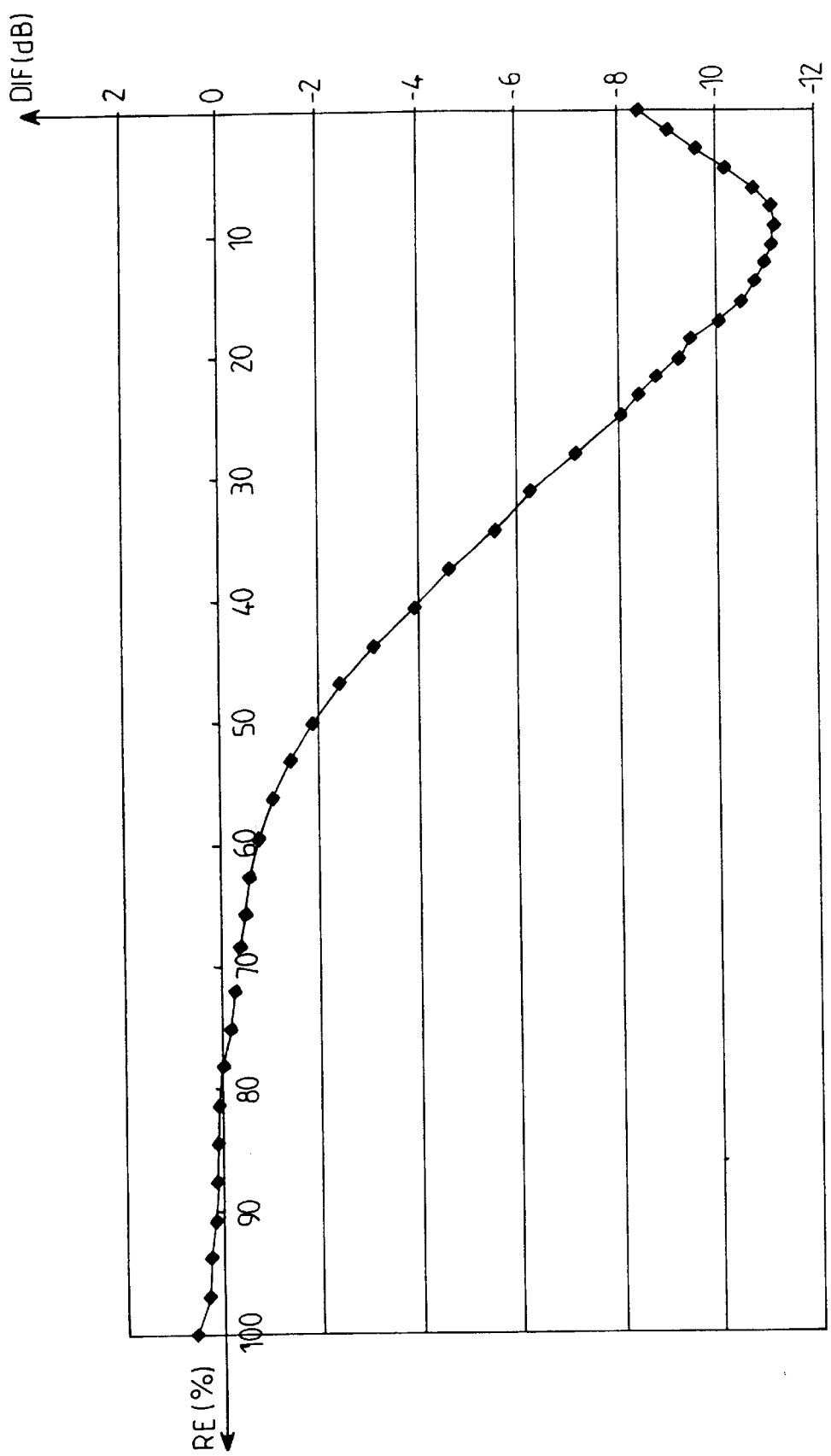
Figure 6:
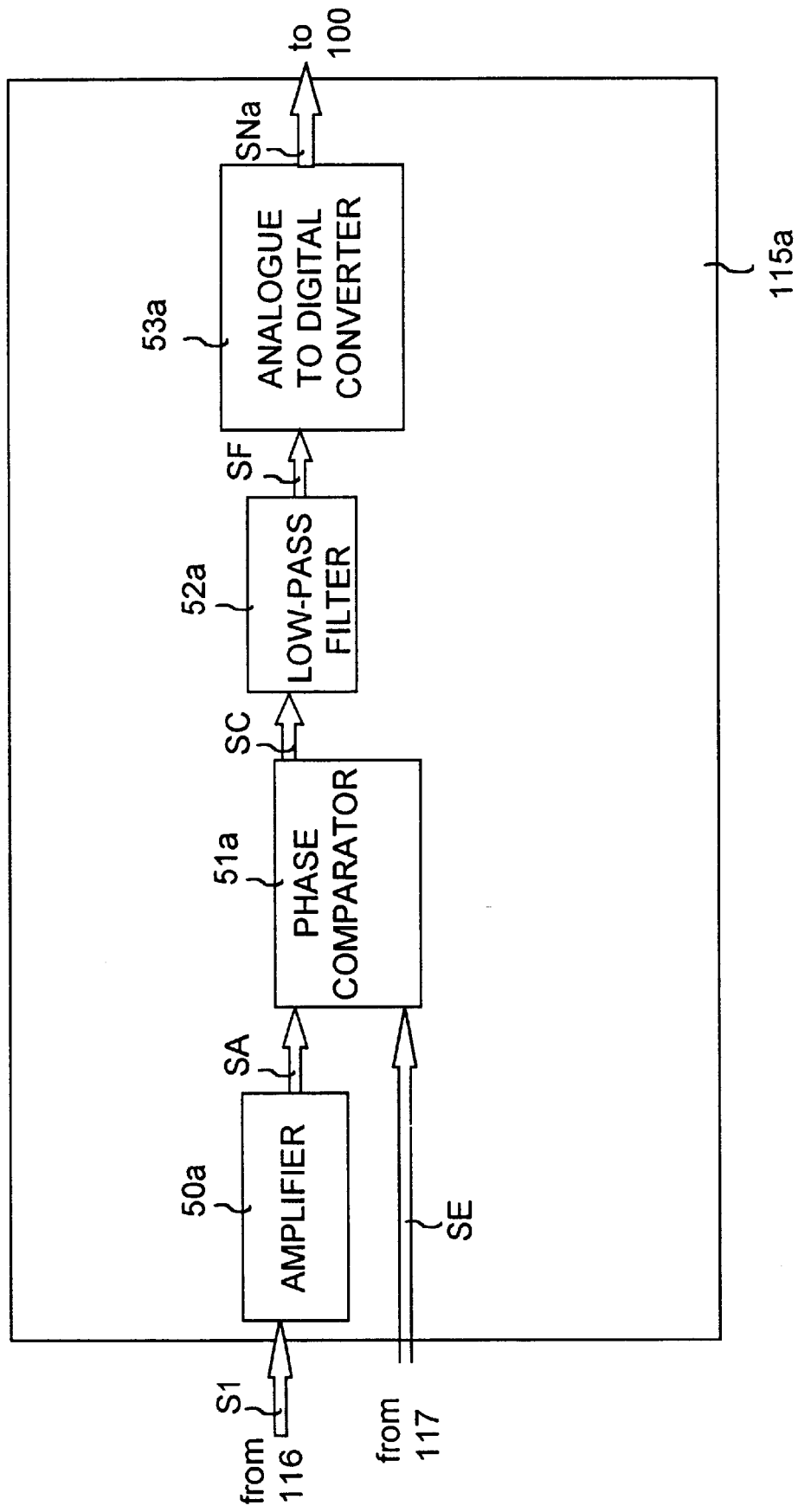
Figure 7:
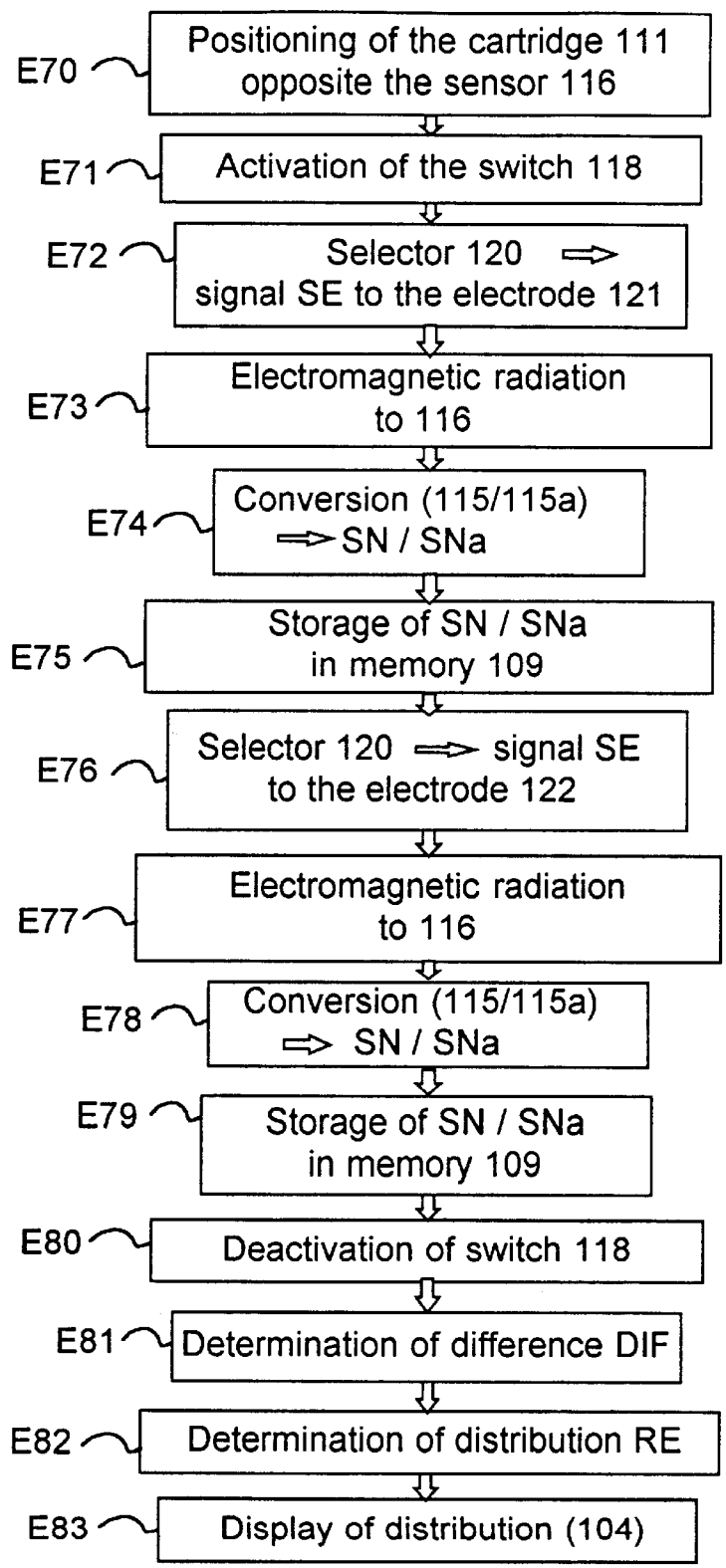
Figure 8:
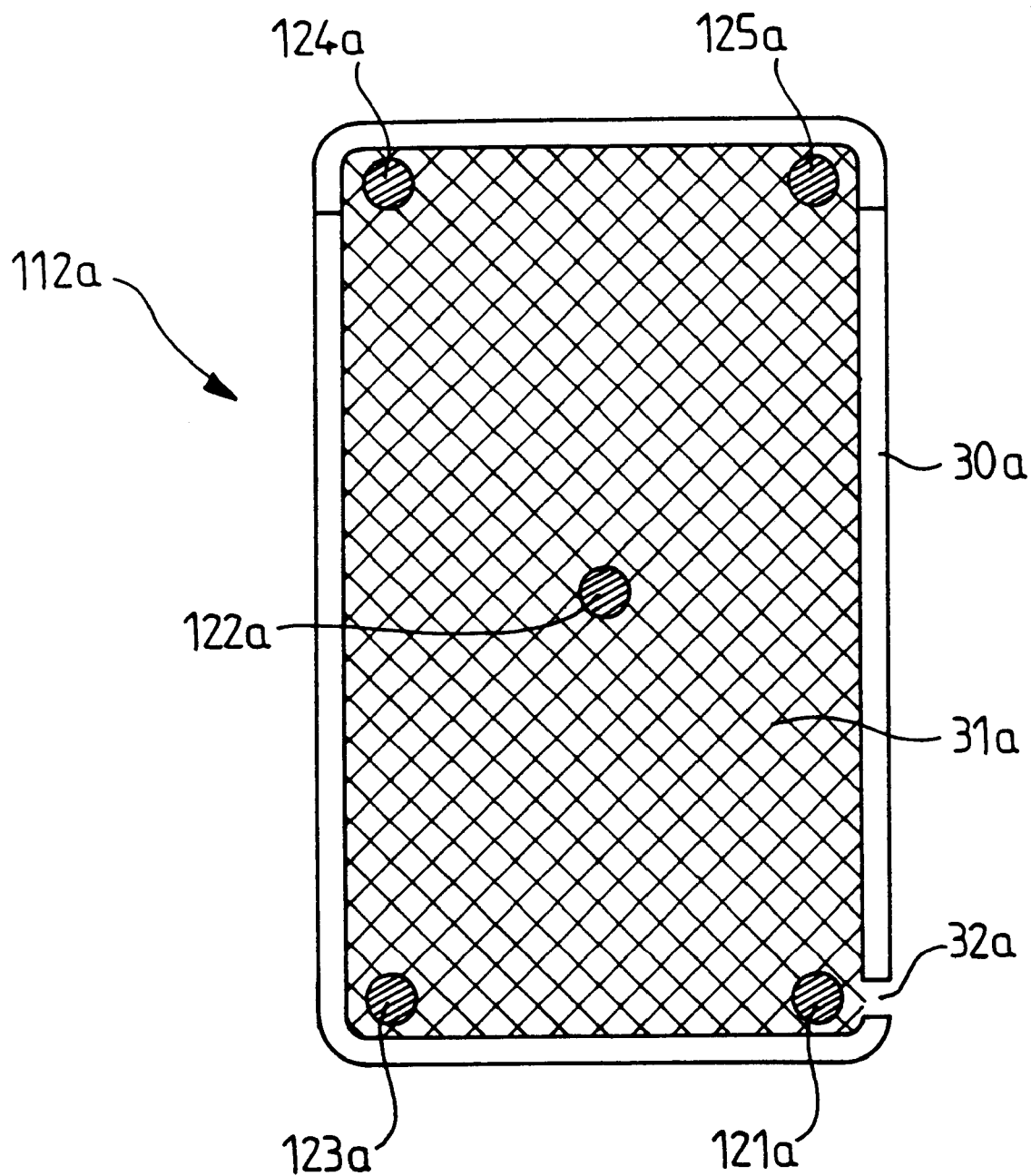
Figure 9:
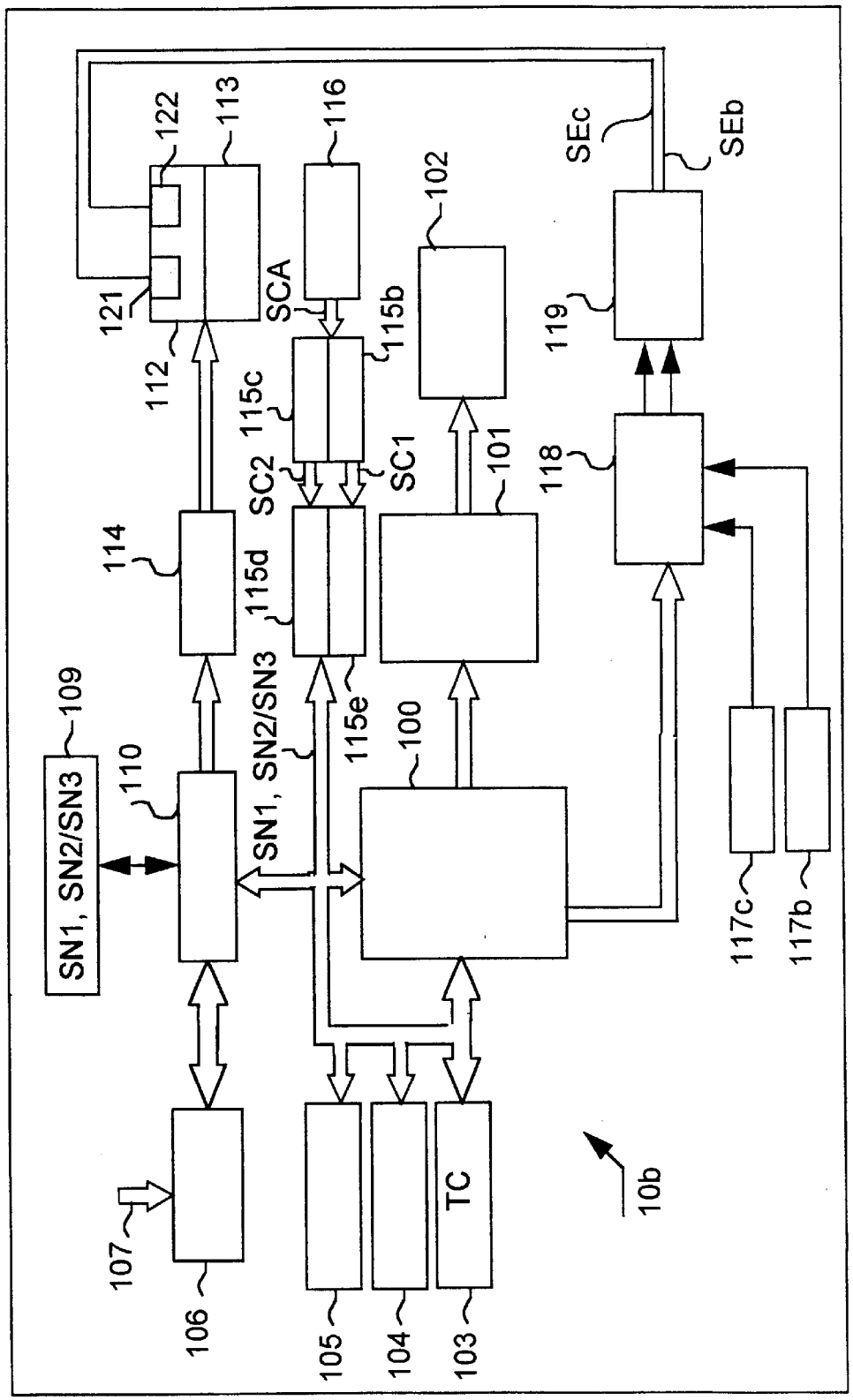
Figure 10:
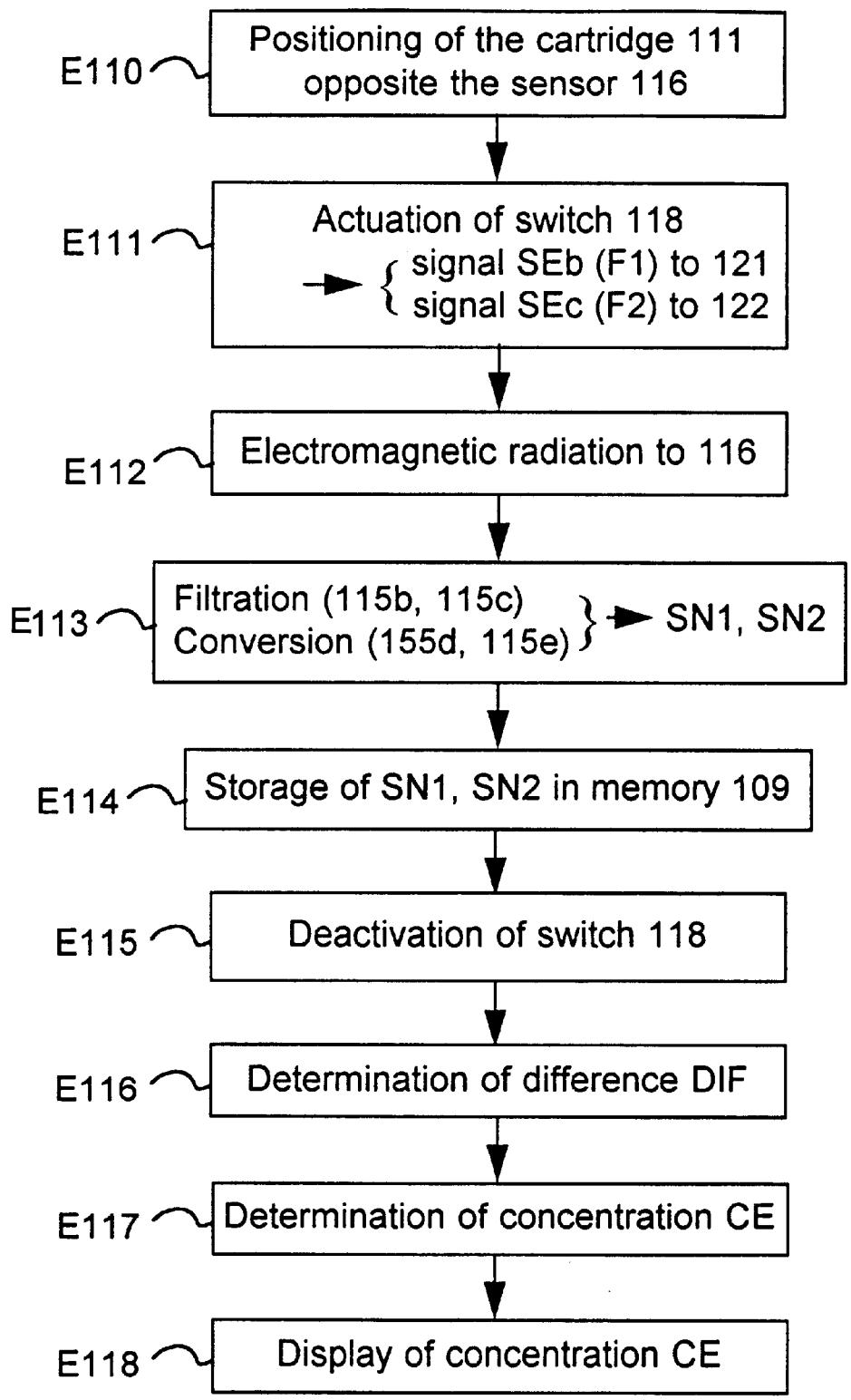

The characteristics and advantages of the present invention will emerge more clearly from a reading of several embodiments illustrated by the attached drawings, in which:

FIG. 1 is a block diagram of a first embodiment of an image transfer device according to the invention, FIG. 2 is a simplified perspective view of part of an image transfer device according to the invention, FIG. 3 is a simplified diagrammatic view of a first embodiment of an ink reservoir included in the device in FIG. 1, FIG. 4 is a block diagram of a conversion circuit according to a first embodiment of the invention, included in the device in FIG. 1, FIG. 5 is an experimental curve representing measurements taken by virtue of the invention, FIG. 6 is a block diagram of a conversion circuit according to a second embodiment of the invention, included in the device in FIG. 1, FIG. 7 is a first embodiment of an algorithm for determining the distribution of ink according to the invention, and FIG. 8 is a simplified schematic view of a second embodiment of an ink reservoir included in the device in FIG. 1, FIG. 9 is a block diagram of a second embodiment of an image transfer device according to the invention, and FIG. 10 is a second embodiment of an algorithm for determining the distribution of ink according to the invention.

With reference to FIG. 1, the invention applies to an image transfer device 10 included generally in an image or data processing device 11. The following description refers particularly to an ink-jet printer, but the image or data processing device 11 can also, for example, be a laser printer, a facsimile machine or a microcomputer. The components other than those of the image transfer device 10 are well known to the man skilled in the art and consequently are neither shown nor described.

The image transfer device 10 receives data to be printed DI through a parallel inlet/outlet port 107 connected to an interface circuit 106. The circuit 106 is connected to an ink ejection control circuit 110, which controls an ink cartridge 111, via an amplification circuit 114.

The ink cartridge 111 is exchangeable and is mounted on a shuttle carriage with reciprocating translational motion, actuated by a motor 102. The ink cartridge 111 includes essentially an ink reservoir 112 and a print head 113. The ink reservoir 112 is filled with a porous body containing ink.

The printer also has a main data processing circuit 100, associated with a read-only memory 103 and a read-write memory 109. The read-only memory 103 contains the operating programs for the main processing circuit 100, while the read-write memory 109, also associated with the ink ejection control circuit 110, temporarily stores the data DI received via the interface 106 and the data processed by the main processing circuit 100.

The main processing circuit 100 is connected to a display 104, on which the main processing circuit 100 controls the display of messages showing the functioning of the printer. The main processing circuit 100 is connected to a keypad 105, having at least one switch, by means of which the user can transmit operating commands to the printer.

The main processing circuit 100 is connected to a purge pump 124. The main processing circuit 100 controls the pump 124 to purge the air or ink contained in the ejection head 113 of the cartridge 111.

The main processing circuit 100 is also connected to the motor 102 via an amplification circuit 101. The motor 102 moves the carriage which carries the print cartridge 111. The motor 102 is for example a stepping motor.

The printer described above is conventional and well known to the man skilled in the art. It will not therefore be described in further detail.

According to the invention, the ink is excited at several points by a predetermined electrical signal and the electromagnetic radiation resulting therefrom is analysed to determine the distribution of ink in the reservoir 12.

The device for determining the distribution of a product present in a reservoir includes an excitation means adapted to excite a plurality of points in the reservoir, and a means for processing the radiation caused by the excitation means.

More particularly, the device includes a plurality of electrodes disposed in the reservoir, so as to be in contact with the product, a means for supplying the electrodes with a predetermined excitation signal causing electromagnetic signals radiated by the product, a means for sensing the electromagnetic signals caused by the respective supplying of the electrodes and for producing electrical signals representing the electromagnetic signals, and means for processing the electrical signals into a signal representing the distribution of product present in the reservoir 112.

According to a preferred embodiment, there are two electrodes 121 and 122, which are supplied selectively and successively by an alternating excitation signal SE at a frequency higher than or equal to 10 MHz, for example 18 MHz, supplied by an oscillator 117 via a switch 118 and an amplifier 119. A selector 120 enables the excitation signal SE to be directed towards one or the other of the electrodes 121 and 122.

The main processing circuit 100 is connected to the switch 118 and to the selector 120 to control them and thus to enable the transmission of the alternating signal between the oscillator 117 and one of the electrodes 121 and 122.

An electromagnetic sensor in the form of a receiving antenna 116 is connected to a conversion circuit 115, itself connected to the main processing circuit 100. The electromagnetic sensor 116 detects electromagnetic radiation emitted by the ink acting as a sending antenna when it is excited by the excitation signal SE. The electromagnetic sensor 116 transforms the electromagnetic signals received into an electrical signal S1. The electromagnetic sensor 116 supplies the electrical signal S1 to the conversion circuit 115 which in response supplies a digital signal SN to the main processing circuit 100.

As a variant, the main processing circuit is replaced by a processing circuit internal to a microcomputer, notably if the image transfer device 10 is included in this microcomputer.

With reference to FIG. 2, the printing device has conventionally a carriage 60 to carry the printing cartridge 111. The carriage is driven in a reciprocating motion along a movement path formed by guide rails 67. The motor 102 (FIG. 1) drives the carriage 60 by means of a belt device 63. The movement path is parallel to a line on a printing medium, not shown, such as a sheet of paper.

A flexible cable 62 connects the amplification circuit 114 to the ink cartridge 111.

According to the invention, the electromagnetic sensor 116 is metallic and elongate. Its length is adapted to the frequency of the excitation signal SE. For example, for a frequency of 18 MHz, it has been shown experimentally that the length of the electromagnetic sensor 116 is preferably 111 mm. The electromagnetic sensor 116 is bonded to a part of the structure of the printing device. As a variant, the electromagnetic sensor is on the reservoir, or inside the reservoir. The electromagnetic sensor detects electromagnetic radiation emitted by the ink cartridge 111.

The flexible cable 62 also connects the selector 120 to the electrodes 121 and 122.

With reference to FIG. 3, the first embodiment of the ink reservoir 112 has schematically a casing 30 made of plastic material permeable to electromagnetic radiation. An orifice 32 is provided for the ink outlet. The casing 30 is filled with a porous body impregnated with ink in liquid form 31. The electrical characteristics of the sending antenna formed by the ink contained in the porous body 31 of the reservoir vary according to the distribution of ink.

The electrode 121 is situated close to the orifice 32. The electrode 122 is situated substantially in the centre of the reservoir 112. The electrodes 121 and 122 are in contact with the ink. The electrodes 121 and 122 are metallic rods, vertical under the conditions of use of the reservoir shown in FIG. 2. As a variant, the electrodes are in the form of conducting layers disposed against the internal vertical walls of the casing 30.

The electrodes 121 and 122 transmit the high-frequency excitation signal SE supplied by the oscillator 117 to the ink in the porous body 31.

Preferably, each of the electrodes 121 and 122 and the receiving antenna 116 are positioned with respect to each other so that, during the measuring, described later, the ink contained in the reservoir is situated between the electrode 121 or 122 and the receiving antenna 116.

The invention applies to a printer with several ink reservoirs, such as a colour printer. In this case, each of the reservoirs is equipped with respective electrodes 121 and 122.

As a variant, the reservoir has one or more mobile electrodes and moving means to convey the electrodes to predetermined positions in the reservoir. This type of reservoir is more particularly a large reservoir intended for example for a device for printing on fabric.

According to FIG. 4, the first embodiment of the conversion circuit 115 includes an amplifier 50 connected to an envelope detector 51. The envelope detector 51 is connected to an analogue to digital converter 52, one output of which is connected to the processing circuit 100.

The electromagnetic sensor 116 supplies the electrical signal S1 to the amplifier 50, which amplifies the electrical signal S1 in current and voltage so as to facilitate the subsequent processing. The electrical signal S1 is a function of the electromagnetic radiation detected.

The amplifier 50 supplies the amplified signal SA to the envelope detector 51, which determines the amplitude of the amplified signal.

The signal S2 output from the envelope detector 51 is supplied to the converter 52. The converter 52 converts the analogue signal S2 into the digital signal SN in order to transmit it to the processing circuit 100.

With reference to FIG. 5, the distribution of ink RE contained in the reservoir 112 is on the x-axis. The distribution of ink RE is the distribution of ink between the region situated around the electrode 121, taken as reference, and the region situated around the electrode 122. The distribution of ink RE is expressed as a percentage of the quantity of ink situated around the electrode 122 compared with the quantity of ink situated in the reference region.

The difference DIF between the electrical signal S1 output from the electromagnetic sensor 116 resulting from the excitation of the electrode 121, and the electrical signal S1 resulting from the excitation of the electrode 122, expressed in dB, is on the y-axis. When the distribution RE has a high value, typically between 100 and 60 percent, in other words there is substantially the same quantity of ink around each of the electrodes, the difference DIF is substantially nil. For distribution values between around 60 and 10 percent, the difference DIF varies linearly. Around 10 percent distribution, the difference DIF has an extreme value and then varies linearly once again when the distribution value decreases.

In other words, when a difference DIF of between –8 and –12 dB is measured, the distribution value RE, as defined above, is less than 20 percent. When the measured difference DIF is between –8 and –2 dB, the distribution value RE is determined at a value between 20 and 50 percent. For a difference DIF of between –2 and 1 dB, the distribution value is higher than 50 percent.

The inventors determined that the position of the extreme value on the curve depends on the position of the electrodes in the reservoir, particularly the position of the electrode 121 situated near the orifice 32.

With reference to FIG. 6, the second embodiment of the conversion circuit is marked 115a. The conversion circuit 115a replaces the circuit 115 and includes, starting from a first input, an amplifier 50a connected to a first input of a phase comparator 51a. A second input of the conversion circuit 115a is connected directly to a second input of the phase comparator 51a. The phase comparator 51a consists for example of an exclusive-OR circuit and is connected to a low-pass filter 52a in series with an analogue to digital converter 53a, one output of which is an output of the conversion circuit 115a connected to the processing circuit 100.

The electromagnetic sensor 116 supplies the electrical signal S1 which is amplified by the amplifier 50a into the amplified signal SA. The signal SA is supplied to the phase comparator 51a. The phase comparator 51a receives the excitation signal SE at its second input, as shown by a dotted line in FIG. 1, and compares the phases of the signals S1 and SE. The result of the comparison is a logic signal SC supplied to the low-pass filter, which filters it into a filtered signal SF. The signal SC is composed of 1 or 0 as a function of the phase equality or phase difference of the compared signals. The low-pass filter integrates the signal SC. The signal SF is supplied to the analogue to digital converter 53a which digitises it into a digital signal SNa and delivers the digital signal SNa to the processing circuit 100. The processing circuit 100 uses the signal SNa like the signal SN. As a variant, the signals SN and SNa are both used to determine the distribution of ink present in the ink reservoir 112 with greater precision.

With reference to FIG. 7, an algorithm according to the invention is stored in the read-only memory 103 of the printing device. The algorithm includes fourteen operations E70 to E83 which are run through periodically for example before printing a document. The algorithm measures the distribution of ink present in the ink reservoir 112.

The operation E70 consists of positioning the carriage 60 bearing the ink cartridge 111 in a given position, facing the receiving antenna 116. As already stated, the relative positions of each of the electrodes 121 and 122 and the receiving antenna 116 are such that the ink is situated between each of the electrodes 121 and 122 and the receiving antenna 116.

The algorithm then goes to the following operation E71, during which the switch 118 is actuated to enable the high-frequency signal generated by the oscillator 117 to pass to the amplifier 119.

In the operation E72, the selector 120 is activated by the processing circuit 100 so that the electrode 121 is supplied with the excitation signal SE. This signal causes the emission of electromagnetic radiation by the ink contained in the porous body 31.

This radiation is sensed at the operation E73 by the antenna 116, which supplies the signal S1 to the conversion circuit 115 which in its turn, at the operation E74, supplies the digital signal SN to the processing circuit 100. As already disclosed, the signal SN represents the amplitude of the electromagnetic radiation sensed. As a variant, the conversion circuit 115a replaces the circuit 115, and supplies the signal SNa, representing the phase difference between the electromagnetic radiation sensed and the excitation signal SE, to the processing circuit 100.

The operation E75 is the storage in the memory 109 of the signal SN or SNa by the processing circuit 100.

In the operation E76, the processing circuit 100 controls the switching of the selector 120 so that the electrode 122 is supplied with the excitation signal SE. This signal causes the emission of electromagnetic radiation by the ink contained in the porous body 31.

This radiation is sensed in the operation E77 by the antenna 116, which supplies the signal S1 to the conversion circuit 115 which in its turn in the operation E78 supplies the digital signal SN or SNa to the processing circuit 100.

The operation E79 is the storage in the memory 109 of the signal SN or SNa by the processing circuit 100.

In the operation E80, the switch is deactivated so as to open the circuit between the oscillator 118 and the electrodes 121 and 122. Neither of the latter is then supplied any more by the excitation signal SE.

The operation E81 is the comparison of the values previously stored in the operations E75 and E79. The operation E81 consists of calculating the decimal logarithms of the values previously stored in the operations E75 to E79, and then of calculating and storing the difference DIF of the logarithms.

In the operation E82 the algorithm determines the distribution of ink RE identified by the difference DIF calculated in the operation E81. For this, a calibration or correspondence table TC stored in the memory 103 supplies the distribution values as a function of the difference values DIF. The table TC is for example the table of the values of the curve in FIG. 5.

As a variant, a more precise result is obtained when several differences DIF calculated successively are compared with the last calculated difference. It is then possible to follow the evolution of the distribution and notably to locate the 10 percent distribution extremum in FIG. 5.

In the operation E83 the ink distribution value is displayed on the display 104 for the benefit of the user. The processing circuit 100 then proceeds to the conventional printer function operations. The ink distribution value is displayed either in figures, or in the form of a diagram.

As a variant, the ink distribution value is transmitted to a remote device, such as a microcomputer, by means of the input/output port 107. The microcomputer then displays the ink distribution value for the user.

According to another variant, an excessively low ink distribution, denoting a heterogeneous distribution of ink in the porous body of the reservoir, gives rise to a warning message on the display 104 for the benefit of the user, or else interrupts the functioning of the printer.

According to yet another variant, a heterogeneous ink distribution causes a movement of the ink cartridge 111 towards the purge pump 124, then a partial purging of the print head 113 in order to draw the ink distant from the outlet orifice 32 towards this latter and thus make the distribution of ink in the reservoir more homogeneous.

FIG. 8 is a schematic view of a second embodiment of a reservoir 112a according to the invention. This second embodiment is distinguished from the previous one in that it has a greater number of electrodes in the porous body of the reservoir. This embodiment enables the distribution of ink in the reservoir to be known more precisely.

The reservoir 112a has a casing 30a containing a porous body 31a impregnated with ink and provided with an outlet orifice 32a. The reservoir 112a has five sending electrodes 121a, 122a, 123a, 124a and 125a distributed throughout the internal volume of the reservoir. The first four electrodes are situated at the four corners of the reservoir and the fifth electrode is situated at the centre of the reservoir. The electrodes are excited successively by the excitation signal SE, as previously described. One of the electrodes is chosen as a reference electrode, for example the electrode 121a situated near to the orifice 32a, and the amplitude differences are calculated with respect to the electrode 121a; as a variant, the phase differences between the radiation sensed and the excitation signal are compared with the radiation caused by the electrode 121a.

The algorithm of FIG. 7 is run through four times in order to compare the distribution of ink around the reference electrode 121a and each of the electrodes 122a, 123a, 124a and 125a.

FIG. 9 depicts a second embodiment of the image transfer device 10b, in which the elements identical to those of the first embodiment are given the same reference. In this embodiment, the electrodes 121 and 122 are excited simultaneously by different excitation signals.

The differences with respect to FIG. 1 are as follows. Oscillators equal in number to the electrodes are connected to a switch 118, itself connected to the electrodes via an amplifier 119. In the embodiment in FIG. 9, the oscillator 117b excites the electrode 121 by means of an excitation signal SEb of predetermined frequency F1, whilst the oscillator 117c excites the electrode 122 by means of an excitation signal SEc of predetermined frequency F2, different from the frequency F1.

An electromagnetic sensor 116 receives a signal radiated by the ink contained in the reservoir 112, and caused by the excitation signals SEb and SEc. The electromagnetic sensor 116 transmits the signal SCA sensed to two filters 115b and 115c, which filter the signal sensed to isolate and separate the signal SC1 due to the excitation signal SEb and the signal SC2 due to the excitation signal SEc.

The signals SC1 and SC2 are supplied respectively to conversion circuits 115d and 115e, similar to the circuit 115 in FIG. 1. The circuits 115d and 115e convert respectively the signals SC1 and SC2 into digital signals SN1 and SN2. The digital signals SN1 and SN2 are similar to the digital signal SN previously described.

As a variant, the circuits 115d and 115e are replaced by a circuit similar to the circuit 115a previously described, which receives the signals SC1 and SC2 and determines their phase difference in order to deliver a digital signal SN3 representing the phase difference.

FIG. 10 depicts a second embodiment of an algorithm intended for the device in FIG. 9. The algorithm has nine operations E110 to E118. This embodiment can be implemented more rapidly than the previous one.

The operation E110 is similar to the operation E70 in FIG. 7, and is the positioning of the cartridge 111 opposite the electromagnetic sensor 116.

The operation E111 is the actuation of the switch 118 in order to transmit the excitation signals SEb and SEc respectively and simultaneously to the electrodes 121 and 122. These signals cause the sending of an electromagnetic signal radiated by the ink contained in the reservoir.

This radiation is sensed in the operation E112 by the sensor 116.

The operation E113 is the filtering of the sensed signal SCA by the filters 115b and 115c, which supply the signals SC1 and SC2 to the conversion circuits 115d and 115e. The conversion circuits supply the digital signals SN1 and SN2 to the processing circuit 100.

The following operations E114 to E118 are similar to the operations E79 to E83 previously described.

Naturally, the present invention is in no way limited to the embodiments described and depicted, but, quite the contrary, encompasses all variants within the reach of the man skilled in the art.

What is claimed is:

1. A method for determining a distribution of a product present in a porous body of a reservoir, comprising the steps of:

exciting a plurality of points in the reservoir one-by-one;
sensing electrical signals caused by said exciting step at a position outside the reservoir; and comparing the electrical signals to determine the distribution of product in the porous body.

2. A method according to claim 1, wherein the product is ink.

3. A method according to claim 1, wherein the electrical signals are comprised of electromagnetic signals.

4. A method for determining a distribution of a product present in a porous body of a reservoir, a plurality of electrodes being disposed inside the reservoir, comprising the steps of:
  supplying one of the electrodes with a predetermined excitation signal;
  sensing a first electrical signal caused by the supplying of one of the electrodes with the excitation signal, said sensing step sensing the first electrical signal at a position outside the reservoir;
  producing a second electrical signal representing the first electrical signal;
  comparing a plurality of second electrical signals produced by repeated operations of said supplying, sensing and producing steps in order to determine the distribution of product in the porous body, wherein the one electrode to which the excitation signal is supplied in said supplying step is changed with each repeated operation; and
  producing a signal representing the distribution of the product present in the porous body of the reservoir.

5. A method according to claim 4, wherein the supplying step and sensing step are carried out successively for each of the electrodes.

6. A method according to claim 5, wherein the excitation signal is identical for each of the electrodes.

7. A method according to claim 6, wherein the comparing step further comprises:
  detecting a respective phase difference between each of the second electrical signals and the excitation signal;
  calculating differences between one of the phase differences and each of the other phase differences; and
  producing the signal representing the distribution of product in the porous body from a given value in a calibration table according to the differences calculated.

8. A method according to claim 6, wherein the comparing step further comprises:
  detecting phase differences between the second electrical signals considered in pairs; and
  producing a signal representing the distribution of product in the porous body from a given value in a calibration table according to the differences detected.

9. A method according to claim 6, further comprising the step of displaying a representation of the distribution of the product present in the porous body of the reservoir.

10. A method according to claim 6, further comprising the step of transmitting the signal representing the distribution of the product present in the porous body of the reservoir to a remote device in order to display a representation of the distribution of the product present in the porous body.

11. A method according to claim 6, wherein the product is ink.

12. A method according to claim 5, wherein the comparing step further comprises:
  detecting a respective phase difference between each of the second electrical signals and the excitation signal;
  calculating differences between one of the phase differences and each of the other phase differences; and
  producing the signal representing the distribution of product in the porous body from a given value in a calibration table according to the differences calculated.

13. A method according to claim 5, wherein the comparing step further comprises:
  detecting phase differences between the second electrical signals considered in pairs; and
  producing a signal representing the distribution of product in the porous body from a given value in a calibration table according to the differences detected.

14. A method according to claim 5, further comprising the step of displaying a representation of the distribution of the product present in the porous body of the reservoir.

15. A method according to claim 5, further comprising the step of transmitting the signal representing the distribution of the product present in the porous body of the reservoir to a remote device in order to display a representation of the distribution of the product present in the porous body.

16. A method according to claim 5, wherein the product is ink.

17. A method according to claim 4, wherein the supplying step includes the simultaneous supplying of the electrodes with excitation signals different from each other.

18. A method according to claim 17, wherein the comparing step further comprises:
  detecting a respective phase difference between each of the second electrical signals and the excitation signal;
  calculating differences between one of the phase differences and each of the other phase differences; and
  producing the signal representing the distribution of product in the porous body from a given value in a calibration table according to the differences calculated.

19. A method according to claim 17, wherein the comparing step further comprises:
  detecting phase differences between the second electrical signals considered in pairs; and
  producing a signal representing the distribution of product in the porous body from a given value in a calibration table according to the differences detected.

20. A method according to claim 17, further comprising the step of displaying a representation of the distribution of the product present in the porous body of the reservoir.

21. A method according to claim 17, further comprising the step of transmitting the signal representing the distribution of the product present in the porous body of the reservoir to a remote device in order to display a representation of the distribution of the product present in the porous body.

22. A method according to claim 17, wherein the product is ink.

23. A method according to claim 2, wherein the processing step further comprises:
  detecting a respective amplitude of each of the second electrical signals;
  calculating differences between one of the amplitudes and each of the other amplitudes; and
  producing the signal representing the distribution of product in the porous body from a given value in a calibration table according to the differences calculated.

24. A method according to claim 4, wherein the processing step further comprises:
  detecting a respective phase difference between each of the second electrical signals and the excitation signal;
  calculating differences between one of the phase differences and each of the other phase differences; and
  producing the signal representing the distribution of product in the porous body from a given value in a calibration table according to the differences calculated.

25. A method according to claim 4, wherein the processing step further comprises
  detecting phase differences between the second electrical signals considered in pairs; and
  producing a signal representing the distribution of product in the porous body from a given value in a calibration table according to the differences detected.

26. A method according to claim 4, further comprising the step of displaying a representation of the distribution of the product present in the porous body of the reservoir.

27. A method according to claim 4, further comprising the step of transmitting the signal representing the distribution of the product present in the porous body of the reservoir to a remote device in order to display a representation of the distribution of the product present in the porous body of the reservoir.

28. A method according to claim 4, wherein each of the first electrical signals is comprised of an electromagnetic signal.

29. A device for determining a distribution of a product present in a porous body of a reservoir, comprising:
  an excitation unit adapted to excite a plurality of points in the reservoir one-by-one;
  a sensing unit adapted to sense electrical signals caused by said excitation unit, said sensing unit positioned outside said reservoir; and
  a comparing unit adapted to compare the electrical signals to determine the distribution of product in the porous body.

30. A device according to claim 29, wherein the electrical signals are comprised of electromagnetic signals.

31. A device for determining a distribution of a product present in a porous body of a reservoir, comprising:
  a plurality of electrodes disposed in the reservoir so as to be in contact with the product;
  a supplying unit adapted to supply one of the electrodes with a predetermined excitation signal causing the product to radiate electromagnetic signals;
  a sensing unit adapted to sense a first electrical signal;
  a producing unit adapted to produce a second electrical signal representing the first-electrical signal;
  a comparing unit adapted to compare a plurality of second electrical signals produced by repeated operations of said supplying, sensing and producing units in order to determine the distribution of product in the porous body, wherein the one electrode to which the excitation signal is supplied is changed with each repeated operation; and
  a processing unit adapted to produce a signal representing the distribution of the product present in the porous body of the reservoir.

32. A device according to claim 31, wherein the electrodes disposed in a given reservoir are situated in different regions of the reservoir.

33. A device according to claim 32, wherein a first electrode is situated near an outlet orifice of the reservoir, and at least one second electrode is situated at a distance from the first electrode.

34. A device according to claim 31, wherein the supplying means includes an oscillator connected to the electrodes via a switch.

35. A device according to claim 31, wherein the supplying means includes a selector for selectively supplying one of the electrodes with said excitation signal.

36. A device according to claim 31, wherein the excitation signal is an alternating high-frequency signal.

37. A device according to claim 31, wherein the excitation signal is an alternating signal with a frequency higher than 10 MHz.

38. A device according to claim 31, wherein the supplying means supplies a predetermined excitation signal at a different frequency to each of the electrodes.

39. A device according to claim 38, further comprising filters for filtering the electrical signals and supplying said filtered signals to the processing means.

40. A device according to claim 31, wherein the supplying means includes a metal component forming an antenna.

41. A device according to claim 40, wherein said sensing means includes a metal ribbon.

42. A device according claim 31, wherein the comparing unit includes an envelope detector for detecting amplitudes of the second electrical signals, a calculating unit adapted to calculate differences between one of the detected amplitudes, and each of the other detected amplitudes and a converting unit adapted to convert the differences calculated into the distribution of the product present in the porous body of the reservoir.

43. A device according to claim 31, wherein the comparing unit includes a phase comparator for determining phase differences between the excitation signal and each of the second electrical signals, respectively, a calculating unit adapted to calculate differences between one of the phase differences and each of the other phase differences, and a converting unit adapted to convert the differences calculated into the distribution of product present in the porous body of the reservoir.

44. A device according to claim 31, further comprising a display unit adapted to display a representation of the distribution of product present in the porous body of the reservoir.

45. A device according to claim 31, wherein the product is ink.

46. A device according to claim 31, wherein each of the electrical signals is comprised of an electromagnetic signal.

47. A device for determining distributions of products present in plural porous bodies of respective plurality of reservoirs respectively, comprising:
  a plurality of electrodes disposed in each of said reservoirs so as to be in contact with the product;
  a supplying unit adapted to supply one electrode from the plurality of electrodes in each of said reservoirs with a predetermined excitation signal causing a first electrical signal from the product in the porous body of each of said reservoirs;
  a sensing unit adapted to sense each of the first electrical signals, said sensing unit being positioned outside said reservoir;
  a producing unit adapted to produce corresponding second electrical signals representing respective ones of each of the first electrical signals;
  a comparing unit adapted to compare a plurality of second electrical signals from each reservoir, each said plurality of second signals being produced by repeated operation of said supplying, sensing and producing units, in order to determine the distribution of product in respective ones of the porous bodies, wherein the one electrode to which the excitation signal is supplied by said supplying unit is changed with each repeated operation; and
  a processing unit adapted to produce a signal representing a distribution of the ink present in the porous body of each reservoir.

48. A device according to claim 47, wherein the electrodes disposed in a given reservoir are situated in different regions of the reservoir.

49. A device according to claim 47, wherein the supplying means includes an oscillator connected to the electrodes via a switch.

50. A device according to claim 47, wherein the supplying means includes a selector for selectively supplying one of the electrodes with said excitation signal.

51. A device according to claim 47, wherein the excitation signal is an alternating high-frequency signal.

52. A device according to claim 47, wherein the excitation signal is an alternating signal with a frequency higher than 10 MHz.

53. A device according to claim 47, wherein the supplying means supplies a predetermined excitation signal at a different frequency to each of the electrodes.

54. A device according to claim 47, wherein the supplying means includes a metal component forming an antenna.

55. A device according to claim 54, wherein said sensing means includes a metal ribbon.

56. A device according to claim 47, wherein the comparing unit includes an envelope detector for detecting amplitudes of the second electrical signals, a calculating unit adapted to calculate differences between one of the detected amplitudes and each of the other detected amplitudes, and a converting unit adapted to convert the differences calculated into the distribution of the product present in the porous body of the reservoir.

57. A device according to claim 47, wherein the comparing unit includes a phase comparator for determining phase differences between the excitation signal and each of the second electrical signals, respectively, a calculating unit adapted to calculate differences between one of the phase differences and each of the other phase differences, and a converting unit adapted to convert the differences calculated into the distribution of product present in the porous body of the reservoir.

58. A device according to claim 47, further comprising a display unit adapted to display a representation of the distribution of product present in the porous body of the reservoir.

59. A device according to claim 47, wherein the product is ink.

60. A device according to claim 47, wherein the electrodes disposed in a given reservoir are situated in different regions of the reservoir, and wherein a first electrode is situated near an outlet orifice of the reservoir, and at least one second electrode is situated at a distance from the first electrode.

61. A device according to claim 47, wherein the supplying means supplies a predetermined excitation signal at a different frequency to each of the electrodes, further comprising filters for filtering the second electrical signals and supplying said filtered signals to the processing means.

62. A device according to claim 47, wherein the comparing unit includes an envelope detector for detecting amplitudes of the second electrical signals, a calculating unit adapted to calculate differences between one of the detected amplitudes and each of the other detected amplitudes, and a converting unit adapted to convert the differences calculated into the distribution of the product present in the porous body of the reservoir, further comprising filters for filtering the electrical signals and supplying said filtered signals to the comparing unit.

63. A device according to claim 47, wherein each of the electrical signals is comprised of an electromagnetic signal.

64. A reservoir for a product, comprising:

a porous body for the product;

a plurality of electrodes disposed in the reservoir so as to be in contact with the product;

a supplying unit adapted to supply said electrodes with an excitation signal causing the product to radiate electrical signals;

a sensing unit adapted to sense the electrical signals caused by supply of the excitation signal to said electrodes, said sensing unit disposed outside said reservoir; and a comparing unit adapted to compare the electrical signals so as to determine distribution of the product in the porous body.

65. A reservoir according to claim 64, wherein said electrodes are situated in different regions of the reservoir.

66. A reservoir according to claim 65, wherein a first electrode is situated near an outlet orifice of the reservoir, and at least one second electrode is situated at a distance from the first electrode.

67. A reservoir according to claim 64, wherein the electrical signals are comprised of electromagnetic signals.

68. A reservoir for ink, comprising:

a porous body for the ink;

a plurality of electrodes disposed in the reservoir, so as to be in contact with the ink;

a supplying unit adapted to supply said electrodes with an excitation signal causing the ink to radiate electrical signals;

a sensing unit adapted to sense the electrical signals caused by supply of the excitation signal to said electrodes, said sensing unit disposed outside said reservoir; and a comparing unit adapted to compare the electrical signals so as to determine distribution of the ink in the porous body.

69. A reservoir according to claim 68, wherein said electrodes are situated in different regions of the reservoir.

70. A reservoir according to claim 68, wherein said electrodes are situated in different regions of the reservoir, and wherein a first electrode is situated near an outlet orifice of the reservoir, and at least one second electrode is situated at a distance from the first electrode.

71. A reservoir according to claim 68, wherein the electrical signals are comprised of electromagnetic signals.

72. An image transfer device having a reservoir containing ink in a porous body, comprising:

an image forming unit adapted to form an image using the ink based on image data;

a plurality of electrodes disposed in the reservoir so as to be in contact with the ink;

a supplying unit adapted to supply one electrode from the plurality of electrodes with a predetermined excitation signal causing the ink to radiate a first electrical signal;

a sensing unit adapted to sense each of the first electrical signals, said sensing unit being positioned outside said reservoir;

a producing unit adapted to produce corresponding second electrical signals representing respective ones of each of the first electrical signals;

a comparing unit adapted to compare a plurality of second electrical signals from each reservoir, each said plurality of second electrical signals being produced by repeated operations of said supplying, sensing and producing unit, in order to determine the distribution of ink in the porous body, wherein the one electrode to which the excitation signal is supplied by said supplying unit is changed with each repeated operation; and a processing unit adapted to process a signal representing the distribution of product present in the porous body.

73. An image transfer device according to claim 72, wherein said image transfer device comprises a printer.

74. An image transfer device according to claim 72, wherein said image transfer device comprises a facsimile machine.

75. An image transfer device according to claim 72, wherein said image transfer device comprises a microcomputer.

76. An image transfer device according to claim 72, further comprising filters for filtering the second electrical signals and supplying said filtered signals to the comparing unit.

77. An image transfer device according to claim 72, wherein each of the first electrical signals is comprised of an electromagnetic signal.

78. A method for determining a distribution of a product present in a porous body of a reservoir, a plurality of electrodes being disposed inside the reservoir, comprising the steps of:

supplying one of the electrodes with a predetermined excitation signal;

sensing a first electrical signal caused by the supplying of one of the electrodes with the excitation signal, said sensing step sensing the first electrical signal at a position outside the reservoir;

producing a second electrical signal representing the first electrical signal;

comparing a plurality of second electrical signals produced by repeated operations of said supplying, sensing and producing steps in order to determine the distribution of product in the porous body, wherein the one electrode to which the excitation signal is supplied in said supplying step is changed with each repeated operation; and producing a signal representing the distribution of the product present in the porous body of the reservoir, wherein the product is ink.

* * * * *

UNITED STATES PATENT AND TRADEMARK OFFICE
CERTIFICATE OF CORRECTION

PATENT NO.     : 6,361,135 B1
DATED          : March 26, 2002
INVENTOR(S)    : Pascal Coudray et al.

It is certified that error appears in the above-identified patent and that said Letters Patent is hereby corrected as shown below:

<u>Title page, Item [54] and Column 1, line 4,</u>
"IMAGE DEVICE" should read -- IMAGE TRANSFER DEVICE --.

<u>Column 5,</u>
Line 57, "reservoir 12." should read -- reservoir 112. --.

<u>Column 12,</u>
Line 49, "claim 2," should read -- claim 4, --.

<u>Column 13,</u>
Line 2, "comprises" should read -- comprises: --;
Line 41, "first-electrical" should read -- first electrical --; and
Lines 61 and 64, "means" should read -- unit --.

<u>Column 14,</u>
Lines 5, and 9, "means." should read -- unit. --;
Lines 11 and 13, "means" should read -- unit --;
Line 18, "amplitudes," should read -- amplitudes -- and "amplitudes" should read -- amplitudes, --.

<u>Column 15,</u>
Lines 5, 8, 16, 19, 22 and 52 and "means" should read -- unit --; and
Line 55, "means." should read -- unit. --.

UNITED STATES PATENT AND TRADEMARK OFFICE
CERTIFICATE OF CORRECTION

PATENT NO.    : 6,361,135 B1
DATED         : March 26, 2002
INVENTOR(S)   : Pascal Coudray et al.

It is certified that error appears in the above-identified patent and that said Letters Patent is hereby corrected as shown below:

Column 17,
Line 1, "unit," should read -- units, --.

Signed and Sealed this

Twentieth Day of May, 2003

JAMES E. ROGAN
*Director of the United States Patent and Trademark Office*